United States Patent
Conrad et al.

(10) Patent No.: US 12,523,779 B2
(45) Date of Patent: Jan. 13, 2026

(54) SIGNAL PROCESSING CHAIN FOR A GNSS RECEIVER FOR PROCESSING AND DISTRIBUTING SIGNALS RECEIVED WITH AN ANTENNA ARRAY TO GNSS RECEIVERS

(71) Applicant: Robert Bosch GmbH, Stuttgart (DE)

(72) Inventors: Henry Conrad, Markgroeningen (DE); Safwat Irteza Butt, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 425 days.

(21) Appl. No.: 18/065,126

(22) Filed: Dec. 13, 2022

(65) Prior Publication Data

US 2023/0266478 A1    Aug. 24, 2023

(30) Foreign Application Priority Data

Jan. 7, 2022    (DE) .......................... 102022200107.9

(51) Int. Cl.
*G01S 19/32*    (2010.01)
*G01S 19/37*    (2010.01)

(52) U.S. Cl.
CPC .............. *G01S 19/32* (2013.01); *G01S 19/37* (2013.01)

(58) Field of Classification Search
CPC .......... G01S 19/32; G01S 19/37; G01S 19/21; G01S 19/36; G01S 19/01; H04L 5/14; H04B 1/10; H04B 1/0053; H03H 7/46; H03H 7/48; H03H 9/64; H03H 9/72; H01P 5/12
USPC .............. 342/357.31, 357.4, 357.59, 357.72; 343/100, 134, 167, 175, 185; 455/132, 455/143, 188.1
See application file for complete search history.

(56) References Cited

U.S. PATENT DOCUMENTS

| | | | | |
|---|---|---|---|---|
| 2013/0141276 | A1* | 6/2013 | Artushkin | G01S 19/425 |
| | | | | 342/357.24 |
| 2014/0077865 | A1* | 3/2014 | Ashjaee | G01S 19/21 |
| | | | | 327/513 |
| 2014/0368379 | A1* | 12/2014 | Lennen | G01S 19/33 |
| | | | | 342/357.73 |
| 2016/0245923 | A1* | 8/2016 | Badke | G01S 19/33 |
| 2017/0153332 | A1* | 6/2017 | Wallace | G01S 19/36 |
| 2021/0124059 | A1* | 4/2021 | Kowada | G01S 19/22 |
| 2021/0124106 | A1* | 4/2021 | Wetle | G02B 6/02052 |

* cited by examiner

*Primary Examiner* — Ladimir Magloire
*Assistant Examiner* — Remash R Guyah
(74) *Attorney, Agent, or Firm* — Maginot, Moore & Beck LLP

(57) ABSTRACT

A signal processing chain includes a common input for signals received with an antenna array, a diplexer splitting signals to a first path and a second path and a Wilkinson divider splitting signals from the first path to a two subpaths. One GNSS receiver is connected to the first subpath, a second GNSS receiver is connected to the second subpath and a third GNSS receiver is connected to the second path. The diplexer is configured to transmit two different frequency channels for the first GNSS receiver and the second GNSS to the first path. Respective band-pass filters are connected in the first and second path, the passband widths of which are set taking into account at least one GNSS receiver connected downstream of this band-pass filter. Respective low-pass filters suppressing high-frequency interference in a signal received by the antenna array is connected in the first and second path.

13 Claims, 1 Drawing Sheet

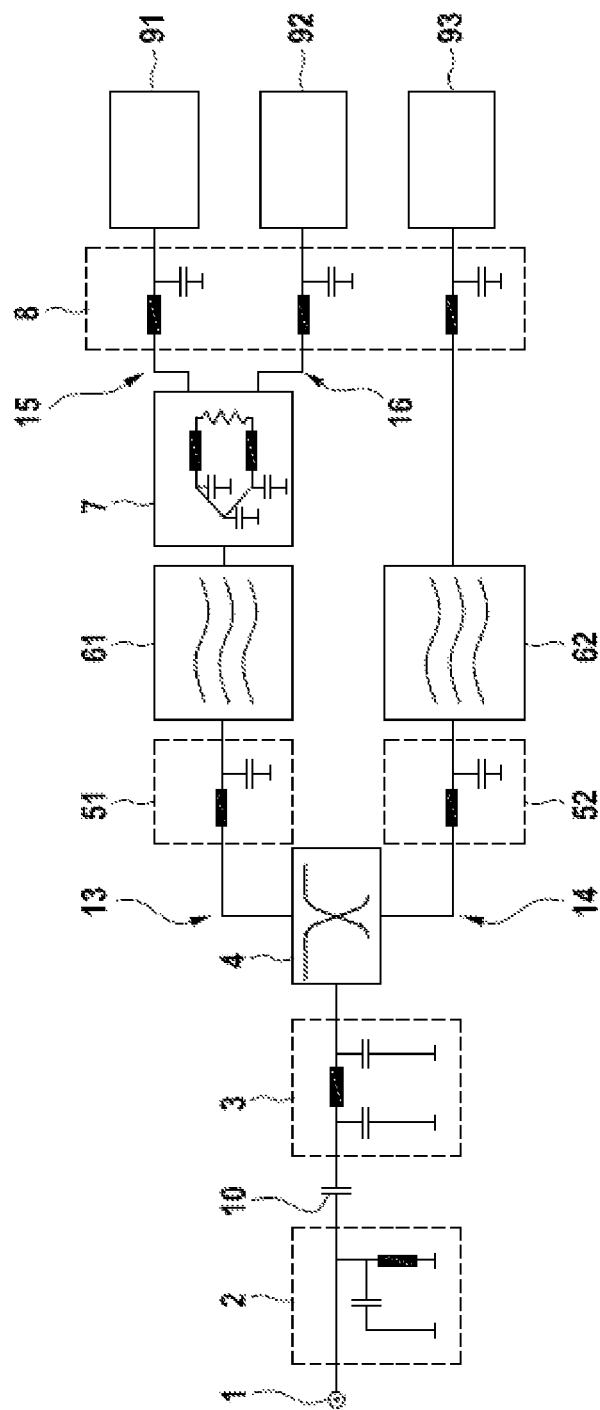

SIGNAL PROCESSING CHAIN FOR A GNSS RECEIVER FOR PROCESSING AND DISTRIBUTING SIGNALS RECEIVED WITH AN ANTENNA ARRAY TO GNSS RECEIVERS

This application claims priority under 35 U.S.C. § 119 to patent application no. DE 10 2022 200 107.9, filed on Jan. 7, 2022 in Germany, the disclosure of which is incorporated herein by reference in its entirety.

The present disclosure relates to a signal processing chain for a global navigation satellite system (GNSS) receiver for processing and distributing signals received with an antenna array to at least three GNSS receivers. The disclosure relates in particular to a GNSS receiver and a localization system comprising such a signal processing chain and a method for processing and distributing GNSS signals received with an antenna array.

BACKGROUND

A global navigation satellite system (abbreviation: GNSS) is a system for position determination and navigation on Earth and in the air by receiving navigation satellite signals. A navigation satellite signal includes positioning information, which is encoded on a specific carrier frequency. Currently being used for highly accurate position determination is the multi-frequency method, in which multiple navigational satellite signals are received simultaneously on different carrier frequencies.

In the GNSS receivers currently being used, a navigation satellite signal is typically received by an antenna array and makes its way to a GNSS receiver via a signal processing chain. To carry out the multi-frequency method, it is desirable to have a signal processing chain that is compatible with navigation satellite signals on different carrier frequencies and that processes these navigation satellite signals with as little insertion loss, interband aliasing and group delay as possible, and then distributes the respective navigation satellite signals to the correct GNSS receivers.

It is also desirable to have a multi-frequency GNSS receiver for simultaneous reception of navigation satellite signals on different carrier frequencies that is compact in design.

SUMMARY

Proceeding from this, a signal processing chain for a GNSS receiver for frequency-selective processing and distribution of signals received with an antenna array to at least three GNSS receivers for receiving different frequency channels is described, wherein the signal processing chain comprises a common input for signals received with the antenna array, a first signal splitting with a diplexer for splitting signals to a first main path and a second main path and a second signal splitting with a Wilkinson divider for splitting signals from the first main path to a first subpath and a second subpath, wherein a first GNSS receiver is connected to the first subpath, a second GNSS receiver is connected to the second subpath and a third GNSS receiver is connected to the second main path, the diplexer is configured in such a way that at least two different frequency channels for the first GNSS receiver and the second GNSS receiver are transmitted to the first main path, a respective band-pass filter is connected in the first main path and in the second main path, the passband widths of which are set taking into account at least one GNSS receiver connected downstream of this band-pass filter, and a respective low-pass filter capable of suppressing high-frequency interference in a signal received by the antenna array is further connected in the first main path and in the second main path.

The described signal processing chain is particularly well-suited for use in the radio frequency (RF) front end of a GNSS receiver, in particular a triple frequency GNSS receiver, to frequency selectively process signals received from an antenna array and frequency selectively distribute the processed signal to the GNSS receivers of the GNSS receiver.

Currently, the following global navigation satellite systems (GNSS) are available:
Navigation Satellite Timing and Ranging (NAVSTAR) Global Positioning System (GPS) of the United States of America,
Global Satellite Navigation System (GLONASS) of the Russian Federation,
Galileo of the European Union, and
BeiDou of the People's Republic of China.

Each GNSS comprises a plurality of GNSS satellites, each of which transmits a GNSS satellite signal on a specific carrier frequency in the form of an electromagnetic wave. A GPS satellite may transmit a GPS satellite signal on the L1 carrier frequency (1575.42 MHz) or on the L2 carrier frequency (1227.60 MHz), for instance.

Satellite-based augmentation systems (abbreviation: SBAS) that can support GNSS are currently available as well. SBAS provide additional information, in particular correction information relating to a GNSS, which can increase the reliability, accuracy and availability of the position determination. The correction information is likewise usually transmitted by a geostationary satellite in the form of an electromagnetic wave at a specific carrier frequency. Such correction information in the form of an electromagnetic wave is hereinafter referred to as a GNSS correction signal.

To determine the position with high precision, a GNSS receiver can receive and evaluate GNSS satellite signals and GNSS correction signals on different carrier frequencies. For example, such a GNSS receiver may receive and evaluate a GPS satellite signal on the L1 carrier frequency and a GPS satellite signal on the L2 carrier frequency, and also a GPS correction signal on an L carrier frequency.

To provide the GNSS receiver with a compact structure, it is proposed here that GNSS satellite signals and GNSS correction signals be received on different frequencies by means of a common antenna array. A signal received by the antenna array can therefore comprise a variety of frequency components (e.g., L1+L2+L). A signal received by the antenna array is hereinafter referred to as an antenna signal.

To decode positioning information or correction information encoded on a specific carrier frequency, it is preferred that the antenna signal containing different frequency components (e.g., L1+L2+L) be split into subsignals, each of which comprises a part (e.g., L1 or L2 or L) of the entire frequency spectrum of the original antenna signal.

The signal processing chain is primarily used here to split an antenna signal containing different frequency components into subsignals and to distribute the subsignals to the respective GNSS receivers, wherein the respective subsignals comprise only the frequency component containing positioning information or correction information when input into the GNSS receivers. The number of GNSS receivers can thereby be equal to the number of subsignals. Each GNSS receiver thus receives only one subsignal with a specific frequency component and inputs this subsignal into a control unit, for example for decoding and/or evaluating the positioning or correction information contained in this subsignal. Each GNSS receiver can be structurally and functionally designed according to the subsignal to be received.

The signal processing chain is coupled between the antenna array and the GNSS receivers of the GNSS receiver and comprises an input for receiving signals from an antenna array, a first signal splitting and a second signal distribution, as well as a plurality of outputs for connecting the individual GNSS receivers. The input of the signal processing chain is connected immediately downstream of the antenna array and is configured as a common input for an antenna signal on different frequencies. A DC power supply can be provided at the input if necessary. A weak antenna signal can be amplified for further processing, and/or the interference component of the antenna signal can be suppressed. The first and the second signal splitting of the signal processing chain are connected downstream of the common input and form a plurality of frequency channels for separate transmission of the split subsignals. The outputs are coupled to the GNSS receivers. Preferably only the subsignal with the frequency component containing positioning or correction information is present at each output.

The first signal distribution differs structurally and functionally from the second signal splitting and is connected upstream of the second signal splitting.

The first signal splitting comprises the described diplexer, which is connected downstream of the input and splits the signal into a first main path and a second main path and can first split an antenna signal containing different frequency components (e.g., L1+L2+L) into two subsignals on two outputs of the diplexer, wherein the two subsignals each comprise a part of the entire original frequency spectrum. It can be provided, for example, that a subsignal with L1 and L frequency components exits at one output of the diplexer and a subsignal with the L2 frequency component exits at the other output if the antenna signal comprises the L1, L2 and L frequency component.

The second signal splitting comprises a Wilkinson divider, which can be connected downstream of an output of the diplexer and further splits a subsignal present at the second main path into a first subpath and a second subpath. It can be provided, for example, that a subsignal with the L1 and L frequency components present at one output of the diplexer is further split into two further subsignals by a Wilkinson divider connected downstream of this output, wherein one subsignal comprises the L1 frequency component and the other subsignal comprises the L frequency component.

The subsignals at the two outputs of the diplexer comprise a wide frequency spectrum in comparison to the desired carrier frequency. The intent is then to filter the carrier frequency out of this. This is done with the aid of band-pass filters. A band-pass filter, the passband width of which corresponds to the frequency component of the subsignal present at that output that contains the positioning and/or correction information, can be connected downstream of each output of the diplexer. The frequency component of the subsignal that is above and below the passband width can thus be filtered at least partially by the band-pass filter.

However, a band-pass filter can usually not suppress the high-frequency interference, in particular above 4 GHz. To this end, at least one low-pass filter is connected upstream or downstream of each band-pass filter to suppress such high-frequency interference. It is particularly advantageous if at least one low-pass filter is connected upstream of each band-pass filter. In this case, for example, a low-pass filter can be provided in the common input and upstream of the diplexer. Thus, this low-pass filter serves as a common low-pass filter for each band-pass filter. It is also possible for a low-pass filter to be provided downstream of the diplexer and upstream of each band-pass filter. Thus, this low-pass filter serves as an individual low-pass filter for each band-pass filter, the parameters of which are configured individually in relation to the associated band-pass filter.

The described signal processing chain as an RF front end is particularly advantageous for installation in a high-precision, triple frequency GNSS receiver. The triple frequency GNSS receiver comprising such a signal processing chain is particularly well-suited for a GNSS-based localization system for position determination and navigation of a vehicle, in particular an autonomously driving motor vehicle.

The described signal processing chain ensures filtering of out-of-band interference with the lowest possible insertion loss and group delay of GNSS satellite signals and GNSS correction signals within the upper and lower GNSS frequency bands i.e., 1525-1606 MHz or 1196-1251 MHz.

The described signal processing chain is particularly advantageous for processing an antenna signal up to 6 GHz. The use of low-pass filters is particularly advantageous for suppressing high-frequency interference above 4 GHz that cannot be suppressed by the band-pass filters. With the first and second signal splitting connected in series, only two band-pass filters are needed for at least three GNSS receivers. The interband aliasing can thus be reduced in comparison to using three band-pass filters for three GNSS receivers.

The described signal processing chain makes it possible for the at least three GNSS receivers to be adjusted independently of one another as needed and connected in a data-conducting manner to a common antenna array via a DC decoupling capacitor.

It is preferred if each band-pass filter is configured to correspond with two low-pass filters, including one low-pass filter connected upstream of the diplexer for primary suppression and the other low-pass filter connected downstream of the diplexer for secondary suppression of high-frequency interference.

One low-pass filter can be connected as a common low-pass filter immediately downstream of the antenna array and upstream of the diplexer in the common input of the signal processing chain. The high-frequency interference of the antenna signal can thus be suppressed in one go upstream of the diplexer. This improves and facilitates the first signal splitting with the diplexer. It is particularly advantageous if an additional low-pass filter is connected downstream of the diplexer and upstream of each band-pass filter. Thus, the high-frequency interference that cannot be suppressed by the common low-pass filter can be suppressed again by the additional low-pass filter in a relatively narrow frequency band. This is particularly advantageous for the subsequent signal processing.

It is preferred if the band-pass filter is a surface acoustic wave (SAW) filter. A SAW filter can be used in the frequency range from about 35 MHz to about 3000 MHz and, due to its small dimension, low insertion loss, high reliability and high mechanical stability, is particularly advantageous to use in the described signal processing chain.

It is preferred if the low-pass filter connected upstream of the diplexer is a Pi low-pass filter. The Pi low-pass filter can be connected in the common input downstream of the phantom power supply of the antenna array, in particular downstream of a DC decoupling capacitor with respect to the phantom power supply. The Pi low-pass filter consists of an inductor and two capacitors, the parameters of which can be configured such that the frequency component above the upper limit of the GNSS frequency band of all GNSS receivers connected downstream is blocked as much as possible.

It is also preferred if the low-pass filter connected downstream of the diplexer is an LC low-pass filter. The LC low-pass filter consists of an inductor and a capacitor, the parameters of which can be configured such that the frequency component above the passband width of the SAW filter connected downstream of the LC low-pass filter is blocked.

It is preferred if the diplexer and the Wilkinson divider each comprise two outputs, wherein the Wilkinson divider is connected downstream of an output of the diplexer. It is thus possible that only two SAW filters are needed for at least three receivers. This results in less interband aliasing in comparison to the use of three SAW filters for three receivers.

Also proposed is a GNSS receiver which comprises an antenna array, at least three GNSS receivers, and an above-described signal processing chain, wherein the signal processing chain is coupled between the antenna array and the at least three GNSS receivers and is capable of processing the signals received via the antenna array and distributing them to the at least three GNSS receivers.

It is preferred if the at least three GNSS receivers differ from one another in terms of bandwidth.

The GNSS receiver can be configured as a triple frequency GNSS receiver to receive and process GNSS navigation signals and GNSS correction signals on three different carrier frequencies. For this purpose, three receivers can be provided, each of which can receive the antenna signal on a specific carrier frequency. For example, it can be provided that a receiver having a frequency bandwidth between 1560 and 1609 MHz be configured to receive a GPS signal on the L1 carrier frequency, a receiver having a frequency bandwidth between 1196 and 1251 MHz be configured to receive a GPS signal on the L2 carrier frequency, and a receiver having a frequency bandwidth between 1525 and 1559 MHz be configured to receive a GPS correction signal on the L carrier frequency. The position can thus be determined with high precision on the basis of the so-called three-frequency method.

It is preferred if the antenna array is supplied with a current and is capable of receiving GNSS signals on different frequencies.

The antenna array can be configured as an active antenna with a low noise amplifier (abbreviation: LNA). The LNA can be supplied with a DC current by a phantom power supply. A weak antenna signal can consequently be amplified by 20 to 30 dB, taking into account the thermal noise level. Thus, the signal processing chain can process the antenna signal with an optimal strength, for example above 40 dB. A DC decoupling capacitor can additionally be provided in the input of the signal processing chain to decouple the DC current.

A vehicle localization system comprising an above-described GNSS receiver is proposed as well.

Also proposed is a method for processing signals received with an antenna array and distributing the processed signals to at least three GNSS receivers by means of an above-described signal processing chain, wherein a signal received by the antenna array is split into at least three subsignals by a diplexer and then by a Wilkinson divider connected downstream of an output of the diplexer such that each subsignal comprises a frequency component of the entire frequency spectrum of the signal originally received by the antenna array, and this frequency component comprises a GNSS carrier frequency which is filtered out by a SAW filter, and wherein the high-frequency interference that cannot be suppressed by the SAW filter is suppressed by at least one low-pass filter.

BRIEF DESCRIPTION OF THE DRAWING

The disclosure and the technical background will be explained in the following with reference to the figures. It should be noted that the figures are schematic in nature. It should also be noted that the features shown in the FIGURES do not necessarily have to be used in the presented combination; partial features can rather be extracted and combined with other explanations of the description and/or other FIGURES. Something else will apply only if it is explicitly shown here as a mandatory combination of features.

Schematically and as an example, FIG. 1 shows a signal processing chain for a GNSS receiver.

DETAILED DESCRIPTION

The GNSS receiver includes an antenna array 1, three GNSS receivers 91, 92, 93 and a signal processing chain comprising a Pi low-pass filter 3, a diplexer 4, two LC low-pass filters 51, 52, two SAW filters 61, 62, a Wilkinson divider 7 and an RF matching circuit 8.

The antenna array 1 can receive a GNSS signal on a carrier frequency in the L1, L2, or L frequency band. A GNSS signal on a carrier frequency in the L1 frequency band can make its way to the L1 GNSS receiver 91 via the signal processing chain, a GNSS signal on a carrier frequency in the L2 frequency band can make its way to the L2 GNSS receiver 93 via the signal processing chain and a GNSS signal on a carrier frequency in the L frequency band can make its way to the L GNSS receiver 92 via the signal processing chain. The L1 frequency band is between 1560 MHz and 1609 MHz. The L2 frequency band is between 1196 MHz and 1251 MHz. The L frequency band is between 1525 MHz and 1559 MHz. The L1 GNSS receiver 91 is suitable for receiving GNSS satellite signals on an L1 carrier frequency. The L2 GNSS receiver 93 is suitable for receiving GNSS satellite signals on an L2 carrier frequency. The L GNSS receiver 92 is suitable for receiving GNSS correction signals on an L frequency.

The frequency spectrum of a signal received by the antenna array 1 can include the L1 frequency band and/or the L2 frequency band and/or the L frequency band and high-frequency interference.

The signal processing chain is used to split the signal received by the antenna array 1 into subsignals, each comprising one of the above-described frequency bands, and to distribute these subsignals to the respective GNSS receivers 91, 92, 93 and also to suppress the high-frequency interference.

A signal received by the antenna array 1 is first filtered by the Pi low-pass filter 3, wherein the frequency component above the upper limit of the L1, L2 and L frequency bands, i.e., above 1609 MHz, is blocked. This also suppresses high-frequency inference as much as possible.

The signal filtered by the Pi low-pass filter 3 is then split by the diplexer 4 into two subsignals on two outputs of the diplexer 4 into a first main path 13 and a second main path 14, wherein one subsignal comprises the L1 and/or the L frequency band and the other subsignal comprises the L2 frequency band.

The subsignal comprising the L1 and/or L frequency bands is first filtered by the LC low-pass filter 51 and then by the SAW filter 61, wherein the frequency component above the upper limit of the L1 and L bands (i.e., above 1609 MHZ) is blocked by the LC filter 51 and the L1 and/or L frequency band is filtered out by the SAW filter 61. The LC filter 51 can furthermore again suppress the high-frequency interference not suppressed by the Pi low-pass filter 3. This subsignal (in the first main path 13) is then further split by the Wilkinson divider 7 into two subsignals in a first subpath 15 and a second subpath 16. Among these, one subsignal comprises only the L1 frequency band and makes its way to the L1 GNSS receiver 91 via the RF matching circuit 8. The other subsignal comprises only the L frequency band and makes its way to the L GNSS receiver 92 via the RF matching circuit 8.

The subsignal comprising the L2 frequency band is first filtered by the LC low-pass filter 52 and then by the SAW filter 62, wherein the frequency component above the upper limit of the L2 frequency band (i.e., above 1251 MHZ) is blocked by the LC filter 52 and the L2 frequency band is filtered out by the SAW 62. This subsignal then makes its way to the L2 GNSS receiver 93 via the RF matching circuit 8.

The antenna array 1 can be supplied with a DC current by a phantom power supply 2. A DC decoupling capacitor 10, which is connected downstream of the antenna array 1 and upstream of the Pi low-pass filter 3, is provided to decouple the DC current.

The signal processing chain is particularly advantageous for processing a signal up to 6 GHz received by the antenna array 1. The use of the Pi low-pass filter 3 and the LC low-pass filters 51, is particularly advantageous for suppressing the high-frequency interference above 4 GHz that cannot be suppressed by the SAW filters 61, 62. With the diplexer 4 and the Wilkinson divider 7, only two SAW filters 61, 62 are needed for three GNSS receivers 91, 92, 93. The interband aliasing can thus be reduced in comparison to using three band-pass filters for the three GNSS receivers 91, 92, 93. The signal processing chain makes it possible for the three GNSS receivers 91, 92, 93 to be adjusted independently of one another as needed and connected in a data-conducting manner to the common antenna array 1 via the DC decoupling capacitor 10. As a result, a GNSS receiver comprising the described signal processing chain can be constructed in a compact and flexible manner.

The described signal processing chain ensures filtering of out-of-band interference with as little insertion loss and group delay as possible. The described signal processing chain is particularly advantageous for installation in a high-precision, triple frequency GNSS receiver. The triple frequency GNSS receiver comprising such a signal processing chain is particularly well-suited for a GNSS-based localization system for position determination and navigation of a vehicle, in particular an autonomously driving motor vehicle.

What is claimed is:

1. A signal processing chain for frequency-selective processing and distribution of signals received with an antenna array to at least three global navigation satellite system (GNSS) receivers configured to receive different frequency channels, comprising:

a common input for the signals received with the antenna array, a diplexer configured to split the signals to a first main path and a second main path;

a Wilkinson divider configured to split signals from the first main path to a first subpath and a second subpath;

a first band-pass filter connected in the first main path, the passband width of which is set taking into account a first and a second of the at least three GNSS receivers;

a second band-pass filter connected in the second main path, the passband width of which is set taking into account a third of the at least three GNSS receivers;

a first low-pass filter configured to suppress high-frequency interference, the first low-pass filter connected in the first main path between the diplexer and the Wilkinson divider; and a second low-pass filter configured to suppress high-frequency interference, the second low-pass filter connected in the second main path, wherein the first subpath is configured to provide a first GNSS signal received by the antenna array in a first of the different frequency channels to the first of the at least three GNSS receivers, the second subpath is configured to provide a second GNSS signal received by the antenna array in a second of the different frequency channels to the second of the at least three GNSS receivers, the second main path is configured to provide a third GNSS signal received by the antenna array in a third of the different frequency channels to the third of the at least three GNSS receivers, and the diplexer is configured such that at least the first and the second GNSS signals for the first and the second of the at least three GNSS receivers are transmitted to the first main path.

2. The signal processing chain according to claim 1, wherein a third low-pass filter is connected upstream of the diplexer.

3. The signal processing chain according to claim 1, in which each band-pass filter is a surface acoustic wave filter.

4. The signal processing chain according to claim 2, in which the third low-pass filter is a Pi low-pass filter.

5. The signal processing chain according to claim 1, wherein the first and second low-pass filters are LC low-pass filters.

6. A global navigation satellite system (GNSS) receiver system including the signal processing chain of claim 1, comprising:

the antenna array; and the at least three GNSS receivers, in which the signal processing chain is coupled between the antenna array and the at least three GNSS receivers, and is configured to process the first, the second, and the third GNSS signals received via the antenna array and distribute them to a first, a second, and a third of the at least three GNSS receivers.

7. The GNSS receiver according to claim 6, in which the at least three GNSS receivers differ from one another in terms of frequency bandwidth.

8. The GNSS receiver according to claim 6, in which the antenna array is supplied with a current and is capable of receiving GNSS signals on different frequencies.

9. A localization system for vehicles comprising a GNSS receiver according to claim 6.

10. A method for processing signals received with the signal processing chain according to claim 1, comprising:

receiving a combined signal with the antenna array;

splitting the received combined signal into at least the first, the second, and the third GNSS signal with a first and second output of the diplexer, and with the Wilkinson divider connected downstream of the first output of the diplexer such that each of the first, the second, and the third GNSS signal comprises a respective GNSS carrier frequency;

filtering each of the first, the second, and the third GNSS signal with the first band-pass filter or the second band-pass filter; and suppressing high-frequency interference downstream of the first band-pass filter and the second band-pass filter that is not suppressed by the first band-pass filter or the second band-pass filter with the first or the second low-pass filters.

11. The method of claim 10, wherein the first band-pass filter and the second band-pass filter are surface acoustic wave filters.

12. The method of claim 11, wherein the first band-pass filter and the second band-pass filter are the only surface acoustic wave filters in the signal processing chain.

13. The GNSS receiver system of claim 6, wherein the first band-pass filter and the second band-pass filter are the only surface acoustic wave filters in the signal processing chain for the first, the second, and the third of the at least three GNSS receivers.

\* \* \* \* \*